Oct. 25, 1960  A. C. WENNER  2,957,720
SPRING LOCK
Filed May 27, 1958  3 Sheets-Sheet 1
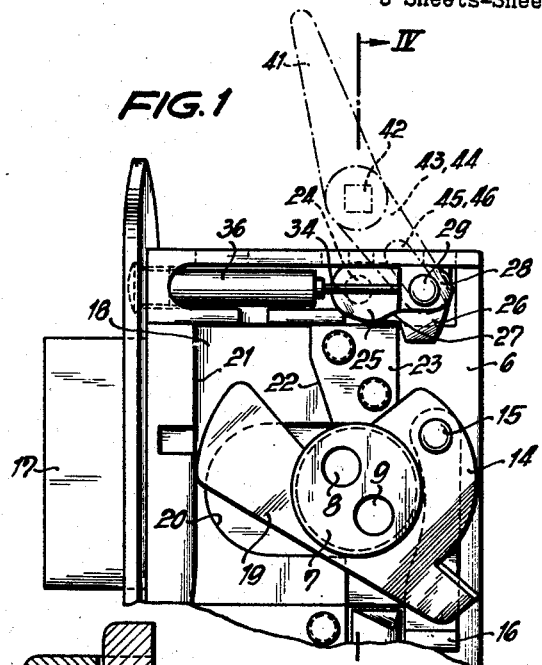
FIG.1
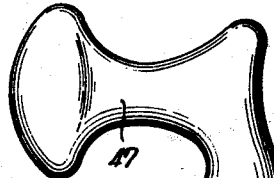
FIG.5
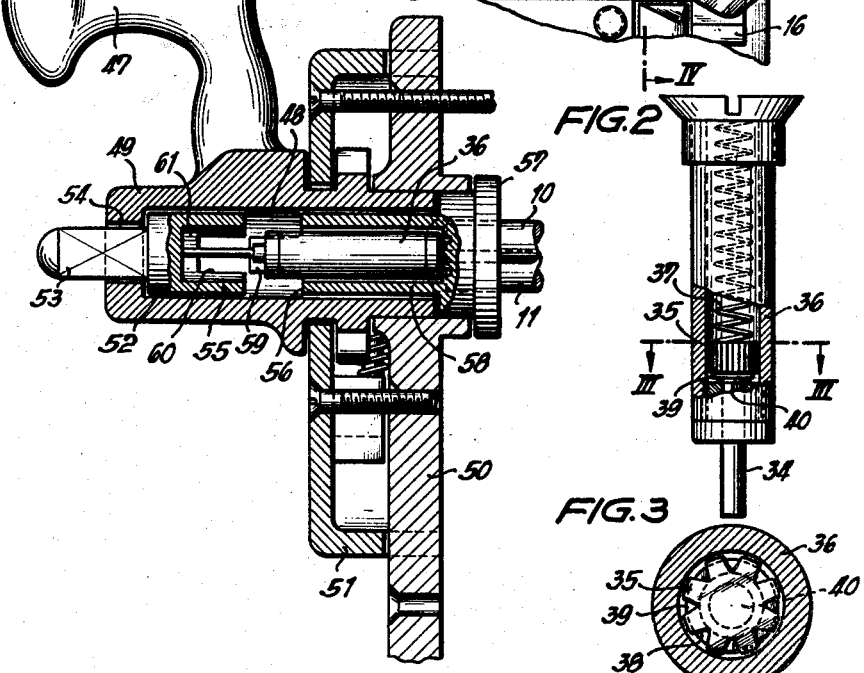
FIG.2
FIG.3
INVENTOR
Arnulf Carl Wenner
by: Michael S. Striker
Attorney Oct. 25, 1960                A. C. WENNER                2,957,720
                              SPRING LOCK
Filed May 27, 1958                                    3 Sheets-Sheet 2

INVENTOR
Arnulf Carl Wenner
by: Michael S. Striker
        Attorney

Oct. 25, 1960    A. C. WENNER    2,957,720
SPRING LOCK

Filed May 27, 1958    3 Sheets-Sheet 3

INVENTOR
Arnulf Carl Wenner
by: Michael S. Striker
Attorney

United States Patent Office 2,957,720
Patented Oct. 25, 1960

2,957,720

SPRING LOCK

Arnulf Carl Wenner, Schwelm, Germany, assignor to Paul Garthe K.G., Ennepetal-Milspe, Germany Filed May 27, 1958, Ser. No. 738,203

Claims priority, application Germany June 8, 1957

3 Claims. (Cl. 292—169)

The present invention relates to locks, and more specifically to a spring lock, especially for motor vehicles, that comprises a bolt adapted when in closing position to be locked and/or disengaged from the lock action or from an external lock operating handle.

Locks which are fitted on doors of motor vehicles and which are not secured by the incorporation of a cylinder action are usually made safe by the provision of a special locking handle inside the vehicle door, which prevents the door from being opened from the outside by unauthorized persons. The disadvantage of this type of locks is that a lock may remain unsecured as the result of forgetfulness or ignorance on the part of the passengers and that the vehicle may then be parked with unlocked doors. In the case of public vehicles, such as motor coaches and the like, there is the further risk of the inside door handle being accidentally or inadvertently operated and of the door swinging open whilst the vehicle is in motion so that a passenger or personnel may fall out and be run over by a vehicle travelling in the opposite direction.

To overcome these drawbacks it is proposed by the present invention to construct a lock in such a way that when the door has been closed an energy storage means will automatically return the member which uncouples the bolt from the lock action or which locks the bolt in closing position, into its operative position from which it must then be moved back into inoperative position by a special locking lever provided either on one or on both sides of the door.

In locks comprising a bolt which can thus be uncoupled from the lock action or from an external handle provided for withdrawing the bolt, a follower may be used which is conveniently contrived in the manner of a bush with dog teeth coupling projections at the end of an extension which projects into the hollow hub of the pivotally mounted door handle, said dog teeth projections cooperating with correspondingly shaped dog teeth projections on a coupling member slidably arranged inside the hollow hub but rotatably connected therewith. The position of the coupling member is controlled by an energy storage means which urges the coupling member into inoperative position and which comprises an extension of angular section arranged to project to the outside from the boss of the hollow hub of the handle in such manner that by pushing the extension into the hub the handle can be coupled with the lock action and the door opened by pressing the handle. In forms of construction in which both the inside and the outside door handles are arranged to be coupled with and uncoupled from the lock action by means of a sleeve-like coupling member, the said coupling member which is controlled by the energy storage means is arranged to extend through the follower into the hub of the handle on the opposite side of the door and in operative position to engage, by means of radial projections, corresponding recesses in both door handle hubs as well as in the follower.

The energy storage means which controls the coupling member may be conveniently contrived in such a way as to act with a delay of between 10 and 15 seconds so that it will permit the door to be reopened within a short time of its having been closed. To this end the energy storage means consists of a cylinder filled with a fluid not affected by changes in temperature, such as glycerin, said cylinder containing a helical spring acting upon a reciprocally slidable plunger with a push rod affixed thereto and projecting through one of the ends of the cylinder. The plunger is provided with axial channels which take effect in the manner of a non-return valve, in such manner that when the helical spring which bears on the plunger is compressed, the fluid can readily escape through the channels from one side of the plunger to the other, whereas during the return motion of the plunger induced by the helical spring the flow section of the channels is substantially reduced and the rate of return of the plunger retarded considerably. Conveniently the said cylinder may be housed inside the hollow sleeve-like coupling member and the plunger push rod arranged to coact with the end face of the door handle hub.

In public vehicles such as motor coaches, railway carriages, and the like, the lock may be so constructed as to comprise, on the inside of the door, in addition to a crank-type door operating handle for withdrawing the bolt by means of the lock action, an additional locking handle in the form of a lever cooperating with a preferably slidably disposed locking member for locking a catch which in operative position prevents the bolt from being withdrawn so that any accidental operation of the inside door handle will not have the effect of withdrawing the bolt unless the locking member has first been moved by manipulation of the additional locking handle into inoperative position in which it releases the catch. To permit the catch to be automatically locked in operative position when the door has been closed, the locking member is acted upon by an energy storage means which urges the same into operative position in such manner that the locking member cannot be displaced into operative position by the energy storage means which may be embodied for instance in a helical spring, until the bolt is in closed position and the catch has dropped into engagement with the bolt. To avoid the necessity of using two hands for opening such a lock and also to avoid the need of having to operate the locking lever for repeatedly moving the locking member into inoperative position when the door is opened and closed in rapid succession, for instance when passengers board or alight from the vehicle at a station, provision is made for retarding the return of the locking member into its operative position by the energy storage means for a suitable period, say 10 to 15 seconds, so that repeated operation of the locking lever will not be required when the door is opened and closed several times in rapid succession. Conveniently the period of delay may be adjustable, and the retarding action is preferably produced by means of the aforementioned spring-loaded plunger reciprocally slidable in a liquid-filled cylinder in that the free end of the push rod of the plunger cooperates with the locking member which may be conveniently guided by a pin arranged to be laterally shiftable, on the one hand, in a slot in the cover plate of the lock and, on the other hand, in a recess in the outside face plate on the door, said pin being embraced by suitably fork-shaped ends of two lever arms affixed to the shaft upon which the locking lever is fulcrumed, so that by deflectably moving the locking lever the locking member may be displaced from its operative into its inoperative position. The catch which coacts with the bolt and which conveniently may be embodied in a tiltable lever with a downwardly projecting tooth adapted to engage behind a suitably formed surface on the bolt has a further projection extending approximately perpendicularly to the plane of the lock, so that in the operative position of the locking member this latter projection will be retained by the locking member and thus prevent the catch from releasing the bolt. This projection is so contrived that in the inoperative position of the locking member the pivotal deflection of the catch into disengaged position will interpose the projection into the path of the locking member and prevent the latter from being returned by its spring into operative position, the deflection of the catch into releasing position when the locking member is in inoperative position being effected by the withdrawal of the bolt.

Preferred embodiments of the invention will now be described by way of example and with reference to the accompanying drawings in which:

Fig. 1 is a front elevational view of a lock according to the invention, with removed cover plate;

Fig. 2 is a side elevational view, on a larger scale and partly in section, of energy storage means housed in a cylinder;

Fig. 3 is a sectional view taken on the line III—III in Fig. 2, on a larger scale than that of Fig. 2;

Figs. 5 and 6 are sectional views of alternative embodiments of the proposed lock.

Figure 4:
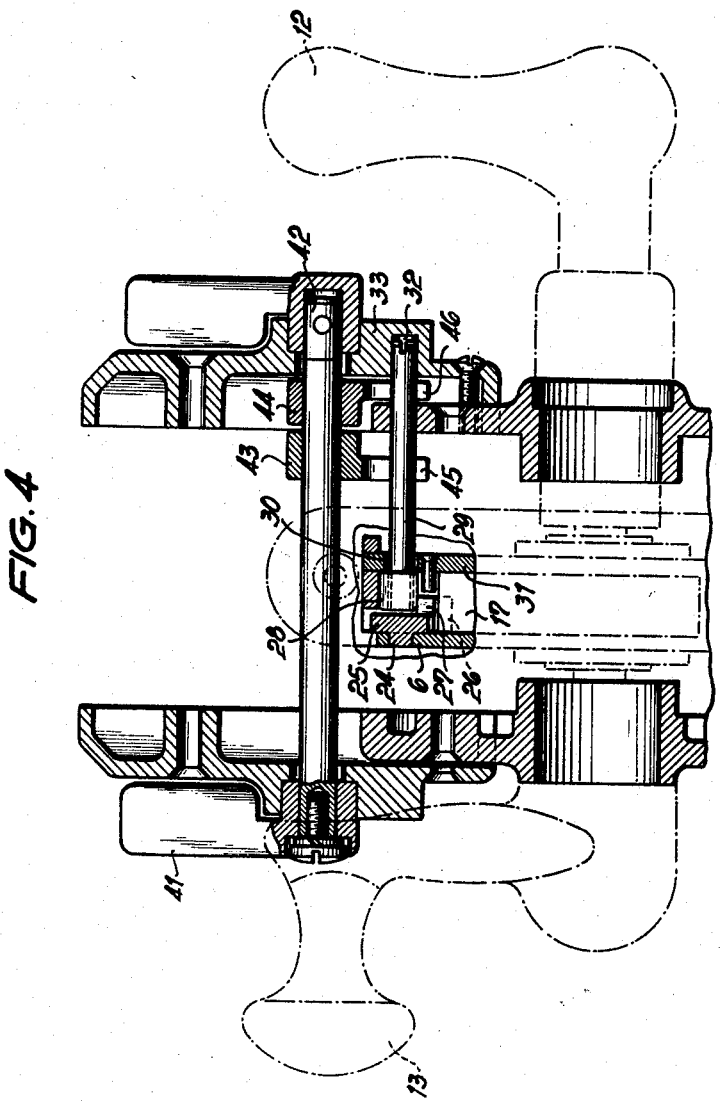
Fig. 4 is a sectional view of the lock taken on the line IV—IV in Fig. 1.

As shown in Fig. 1, a follower 7 is rotatably mounted between a base plate 6 of the lock and a cover plate 31 which latter is assumed to have been removed in Fig. 1. The follower 7 is provided with drilled holes 8 and 9 through which pass pins 10 and 11 attached to door handles 12 and 13 for connecting said handles, shown by dot and dash lines in Fig. 4, with the follower 7. Linked to an extension 14 of the follower 7 by means of a pin 15 is a rod 16 loaded by a helical spring, not shown, pushed over the lower end of the rod and bearing on a ledge inside the lock casing in such a way as to rotatably urge the follower 7 into the position illustrated in Fig. 1. A spring bolt 17 which is slidably mounted inside the lock casing has a portion 18 which is recessed towards the base plate of the lock for accommodating a finger 19 of the follower 7, and an approximately U-shaped opening 20 with parallel edges extending in the direction of motion of the bolt 17. The opening 20 embraces the cylindrical portion of the follower 7 and thus locates and guides the bolt 17. In the position illustrated in Fig. 1 the finger 19 cooperates with a projecting shoulder 21 on the bolt 17 and urges the latter into closing position. When the door handle 12 or 13 is actuated and the follower 7 rotated in clockwise direction, the finger 19 coacts with a face 22 on a second shoulder 23 on the bolt 17 and withdraws the same so that the door can be opened.

Fulcrumed by means of a pin 24 in the base plate 6 of the casing is a catch 25 which has an extension 26 adapted to engage behind the end of the bolt 17. Moreover, a projection 27 on the catch 25 extends perpendicularly to the base plate 6 of the casing and coacts with a slidably displaceable locking member 28 in such manner that in the position illustrated in Fig. 1 the catch 25 will be locked in its engaging position. The locking member 28 is mounted on a pin 29 which extends at right angles across the lock casing and is shiftably held, on the one hand, in a slot 30 in the cover plate 31 and, on the other hand, in a recess 32 in an outside face plate 33. Bearing against the end face of the locking member 28 is a push rod 34 (Fig. 2) affixed to a plunger 35 displaceably housed in a cylinder 36 and loaded by a spring 37 which urges the push rod 34 to displace the locking member 28 into its operative position shown in Fig. 1. The cylinder 36 is filled with a liquid that is unaffected by variations in temperature, such as glycerine, and the plunger 35 is provided with radially cut V-shaped notches 38 (Fig. 3) that extend axially of the plunger so that when the plunger is pushed into the cylinder 36 and compresses the spring 37 the liquid can escape through these notches 38 to the other side of the plunger which carries a substantially annular small plate 39 of a rubber-elastic material, such as a plastic, held by a collar 40 on the push rod 34, so as to retain the inside edge of the plate 39 in such manner that its outer rim can be outwardly deflected by the pressure of liquid escaping through the notches 38. When the spring 37, acting as an energy storage means, pushes the plunger 35 outwardly, the outer rim of the plate 39 which has a diameter that is slightly smaller than the inside diameter of the cylinder 36 will apply itself to the notches 38 in the plunger 35 and thereby reduce the flow section for the re-entry of liquid. The return motion of the plunger is thus braked and retarded.

As shown in Fig. 4, the locking member 28 can be withdrawn by means of a lever handle 41 on the outside of the door, fulcrumed on a rotatably mounted shaft 42 which also carries two levers 43 and 44 with fork-like extensions 45, 46 for engagement of the pin 29 in such manner that when the lever handle 41, indicated in dot and dash lines in Fig. 1, is moved in clockwise direction the locking member 28 will be displaced into its inoperative position to the left and force the push rod 34 and its plunger 35 into the cylinder against the pressure of the spring 37.

To permit the lock to be opened by the handle 13 and the bolt 17 to be withdrawn into inoperative position, the lever 41 must therefore first be deflected, from the position shown in Fig. 1, to the right whereby the locking member 28 will be pushed to the left into unlocking position against the counter-pressure of the spring 37, thus releasing the catch 25, so that when now the crank-type door handle 13 is operated, the follower 7 will be free to turn and by the cooperation of its finger 19 with the face 22 of the shoulder 23 on the bolt 17 withdraw the bolt into unlocking position. The catch 25 is raised by the bolt sliding underneath a sloping face on extension 26, and projection 27 of the catch 25 simultaneously moves into the path of the locking member 28 and prevents the latter from being returned into operative position by the spring 37 and the push rod 34. Not until the door has been shut again and the bolt has returned into the position shown in Fig. 1 can the catch 25 be returned into operative position by the spring-loaded locking member 28 which has a suitably rounded edge for cooperation with a bevelled face on projection 27 of catch 25, as illustrated in Fig. 1, the locking member 28 itself returning into the position shown in the drawing and thereby again locking the bolt. However, owing to the non-return valve effect of the elastic plate 39 on the plunger 35 the notches 38 are sufficiently closed to retard the return motion of the push rod 34, so that for instance in public motor vehicles or the like the door can be opened from the inside repeatedly in succession before the locking member 28 has returned into its operative position, i.e. so that the door can be opened repeatedly without the need each time of first releasing the lock by operation of the lever handle 41.

Another form of construction is shown in Fig. 5 in which a crank-type door handle 47 on the inside of the door must first be coupled with the actuating mechanism of the bolt before the latter can be withdrawn. To this end the handle 47 which is rotatably mounted in a face plate 50 of the lock and in a casing 51 connected therewith has a hub 49 that is provided with a bore 48 for the reception therein of a displaceable coupling member 52 which is provided with an extension 53 which may have, for instance, a square end and which passes through a hole 54 of similar cross section in the end face of the hub 49. The coupling member 52 has projections 55 in the manner of dog teeth concentrically arranged with respect to the longitudinal axis of the coupling member 52 and extending in the axial direction for cooperation with correspondingly shaped recesses 56 in a coupling rod 57 fitted with pins 10 and 11 which pass through the follower and thereby make the connection with the lock action for withdrawing the bolt. The coupling rod 57 has a sleeve-like portion 58 which encloses the cylinder 36 containing the plunger 35 and the spring 37, and which has projections 59 in the manner of dog teeth adapted to engage corresponding recesses 60 in the displaceable coupling member 52, said coupling member 52 being provided with a central bore 61 which is slightly larger than the outside diameter of the cylinder 36 so that when the coupling member 52 is shifted, the forward end of the cylinder 36 can enter the bore. The coupling member 52 is urged by the spring-loaded push rod 34 into its inoperative position.

For opening the door the push button end of extension 53 of the displaceable coupling member 52 inside the hub 49 of the handle 47 need merely be depressed to bring the projections 55 of the coupling member 52 into engagement with the recesses 56 in the sleeve-like portion 58 of the coupling rod 57, so that when the door handle 47 is pressed the coupling member 52 which is non-rotatably but slidably displaceably connected therewith and the sleeve-like portion 58 of the couping rod 57 will actuate the lock and cause the withdrawal of the bolt, the retarded return motion of the spring-loaded push rod 34 permitting the door to be thus opened repeatedly in succession without any further operation of the coupling member 52 by depression of the push button 53.

Figure 7:
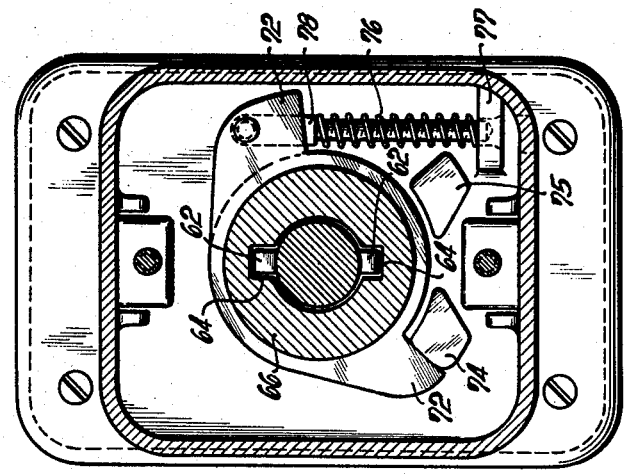
Fig. 7 is a sectional view taken on the line VII—VII in Fig. 6.
Figure 6:
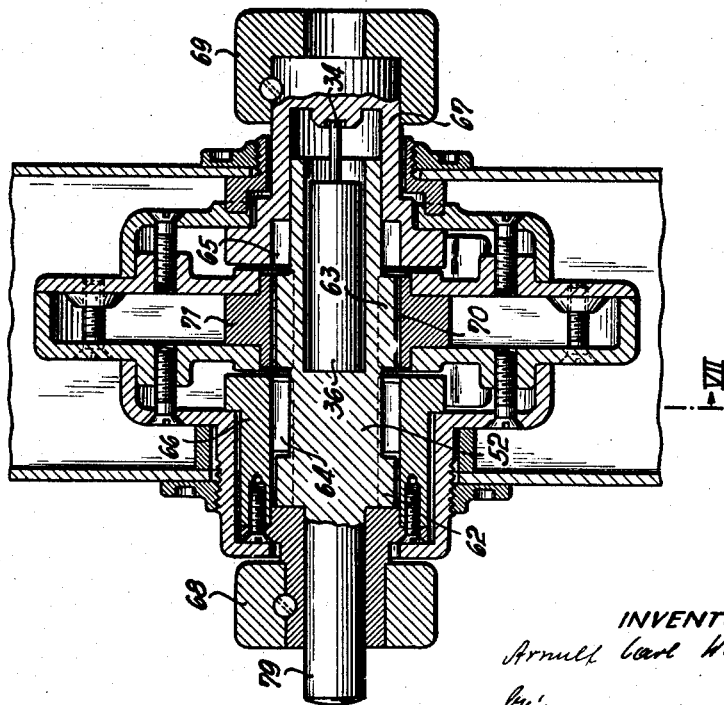

Yet another form of construction for use in motor vehicles in which the inside and outside door handle can be optionally coupled with the lock action is illustrated in Figs. 6 and 7. The coupling member 52 is in this instance provided with radial projections 62 and 63 which, according to the axial position of the coupling member 52, cooperate with radial recesses 64 and 65 in hubs 66 and 67 of door handles 68 and 69, the coupling member 52 being rotatably connected with a follower 71 by the projections 63 which engage recesses 70 in the follower 71 which withdraws the bolt. To ensure that the projections 62 and 63 will always be in register with the recesses 64 and 65, the hubs 66 and 67 are fitted with stop faces 72, 73 which cooperate with fixed stops 74 and 75 to limit the angular deflection of the handles, a helical compression spring 76 which bears, on the one hand, against a fixed abutment 77 and, on the other hand, is linked by means of a pin 78 with the stop face 73 of the door handle hub 66 and 67 respectively urging the hub into contact with the stop 74. The cylinder 36 is contained in the coupling member 52 in the same way as in the embodiment described with reference to Fig. 5, and the coupling member 52 can be displaced by an outside push button control 79 which projects through a hole in the end face of hub 66.

The automatic safety locking mechanism is by no means limited to locks of the kind that have been described and may be adopted in locks of other types. Nor is it necessary for the automatic safety locking mechanism to be arranged axially and it may alternatively consist of a pivotally deflectable lever or so forth. Moreover, a handle 41 or the like may be provided only on the inside of the door and the door arranged to be opened only from the outside by means of the handle 12 in such manner that the outside handle 12 moves the locking member 28 into its inoperative position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. In a lock, in combination, bolt means movable between an advanced position and a retracted position; first manually operated means for moving said bolt means between said positions; a locking member movable between a locking position for locking said bolt means in said advanced position and a disengaged position releasing said bolt means; second manually operated means for moving said locking member to said disengaged position; spring means urging said locking member from said disengaged position to said locking position; catch means controlled by said bolt means to hold said locking member in said disengaged position when said bolt means is in said retracted position and to release said locking member when said bolt means is in said advanced position; and delay means for delaying return of said locking member to said locking position so that said bolt means can be repeatedly operated in succession by said first manually operated means before operation of said second manually operated means is required.

2. A lock as set forth in claim 1 wherein said delay means include a cylinder member, a piston member operatively connected to said locking member, and a fluid in said cylinder member adapted to pass from one side of said piston member to the other side of said piston member, said spring means abutting said piston member, and said piston member including a portion connected to said locking member.

3. A lock as set forth in claim 1 wherein said catch means is formed with a cam face and is movable between a locking position engaging said bolt means for holding the same in said advanced position and a releasing position releasing said bolt means for movement to said retracted position; said locking member being urged by said spring means against said cam face of said catch means.

References Cited in the file of this patent

UNITED STATES PATENTS

| | | |
|---|---|---|
| 1,188,523 | Woodward | June 27, 1916 |
| 1,811,110 | Best et al. | June 23, 1931 |
| 2,497,329 | Smith et al. | Feb. 14, 1950 |
| 2,653,045 | Pinderhughes | Sept. 22, 1953 |

FOREIGN PATENTS

| | | |
|---|---|---|
| 686,081 | France | Apr. 8, 1930 |